United States Patent
Yamauchi

(10) Patent No.: US 10,763,506 B2
(45) Date of Patent: Sep. 1, 2020

(54) METHOD OF MANUFACTURING POSITIVE ELECTRODE MATERIAL FOR ELECTRICAL STORAGE DEVICE

(71) Applicant: Nippon Electric Glass Co., Ltd., Shiga (JP)

(72) Inventor: Hideo Yamauchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/528,847

(22) PCT Filed: Nov. 5, 2015

(86) PCT No.: PCT/JP2015/081186
§ 371 (c)(1),
(2) Date: May 23, 2017

(87) PCT Pub. No.: WO2016/084573
PCT Pub. Date: Jun. 2, 2016

(65) Prior Publication Data
US 2017/0346094 A1    Nov. 30, 2017

(30) Foreign Application Priority Data
Nov. 26, 2014  (JP) .................... 2014-238508

(51) Int. Cl.
| | | |
|---|---|---|
| *H01M 4/58* | (2010.01) | |
| *C01B 25/45* | (2006.01) | |
| *H01M 10/054* | (2010.01) | |
| *H01M 4/62* | (2006.01) | |
| *H01M 4/136* | (2010.01) | |

(52) U.S. Cl.
CPC ............. *H01M 4/58* (2013.01); *C01B 25/45* (2013.01); *H01M 4/5825* (2013.01); *H01M 4/625* (2013.01); *H01M 10/054* (2013.01); *C01P 2004/61* (2013.01); *C01P 2004/62* (2013.01); *H01M 4/136* (2013.01); *H01M 4/62* (2013.01)

(58) Field of Classification Search
CPC ...... H01M 4/58; H01M 4/5825; H01M 4/625; H01M 10/054; C01B 25/45
See application file for complete search history.

(56) References Cited

U.S. PATENT DOCUMENTS
| | | |
|---|---|---|
| 2015/0303470 A1 | 10/2015 | Honma et al. |
| 2016/0126595 A1 | 5/2016 | Fukunaga et al. |

FOREIGN PATENT DOCUMENTS
| | | |
|---|---|---|
| JP | 2010-15782 | 1/2010 |
| JP | 2014-123559 | 7/2014 |
| WO | 2014/199664 | 12/2014 |
| WO | 2013/133369 | 7/2015 |

OTHER PUBLICATIONS

Kim, H., Shakoor, R. A., Park, C., Lim, S. Y., Kim, J.-S., Jo, Y. N., Cho, W., . . . Choi, J. W. (2012). Na2FeP2O7as a Promising Iron-Based Pyrophosphate Cathode for Sodium Rechargeable Batteries: A Combined Experimental and Theoretical Study. Advanced Functional Materials, 23(9), 1147-1155. (Year: 2013).*
International Preliminary Report on Patentability dated May 30, 2017 in International Application No. PCT/JP2015/081186.
International Search Report dated Feb. 9, 2016 in International Application No. PCT/JP2015/081186.
Tsuyoshi Honma et al., "Triclinic $Na_{2-x}Fe_{1+x/2}P_2O_7$/C glass-ceramics with high current density performance for sodium ion battery", Journal of Power Sources, 2013, vol. 227, pp. 31-34.
Office Action dated Nov. 20, 2018 in corresponding Chinese patent application No. 201580039821.9, with English translation of search report.
Prabeer Barpanda et al., "Structural, magnetic and electrochemical investigation of novel binary $Na_{2-x}(Fe_{1-y}Mny)P_2O_7$ ($0 \leq y \leq 1$)pyrophosphate compounds for rechargeable sodium-ion batteries", Solid States Ionics 268 (Mar. 27, 2014) 305-311.
Notice of Reasons for Refusal dated Nov. 5, 2019 in corresponding Japanese Patent Application No. 2016-561475, with English Translation.

* cited by examiner

*Primary Examiner* — James Lee
(74) *Attorney, Agent, or Firm* — Wenderoth, Lind & Ponack, L.L.P.

(57) ABSTRACT

Provided is a method of manufacturing a positive electrode material for an electrical storage device, the positive electrode material for an electrical storage device including a positive electrode active material represented toy the general formula $Na_x(Fe_{1-a}M_a)_yP_2O_z$, where M represents at least one kind of transition metal element selected from the group consisting of Cr, Mn, Co, and Ni, x satisfies $1.2 \leq x \leq 2.8$, y satisfies $0.95 \leq y \leq 1.6$, a satisfies $0 \leq a \leq 0.9$, and z satisfies $7 \leq z \leq 8$, the method including a step of firing an oxide material serving as a raw material at from 400° C. to 610° C. in a reducing atmosphere.

10 Claims, No Drawings

METHOD OF MANUFACTURING POSITIVE ELECTRODE MATERIAL FOR ELECTRICAL STORAGE DEVICE

TECHNICAL FIELD

The present invention relates to a method of manufacturing a positive electrode material to be used in an electrical storage device, such as a sodium ion secondary battery.

BACKGROUND ART

A lithium ion secondary battery has established its position as a high-capacity and lightweight power source indispensable for, for example, a portable electronic terminal or an electric car. An active material containing an olivine-type crystal represented by the general formula $LiFePO_4$ has attracted attention as a positive electrode active material for the lithium ion secondary battery. However, lithium poses a concern about a problem such as a worldwide increase in raw material cost. Accordingly, in recent years, a sodium ion secondary battery has been investigated as an alternative to the lithium ion secondary battery. In Patent Literature 1, there is disclosed a positive electrode active material containing a $Na_xM_yP_2O_7$ crystal, where M represents at least one or more kinds of transition metal elements selected from Fe, Cr, Mn, Co, and Ni, x satisfies $1.20 \leq x \leq 2.10$, and y satisfies $0.95 \leq y \leq 1.60$.

CITATION LIST

Patent Literature 1: WO 2013/133369 A1

SUMMARY OF INVENTION

Technical Problem

In the positive electrode active material for a sodium ion secondary battery disclosed in Patent Literature 1 it is necessary to fire the positive electrode active material at high temperature to reduce Fe ions in glass powder from trivalent ions to divalent ions in order to express battery performances. However, the glass powder particles excessively fuse to each other during firing, resulting in the formation of coarse particles. As a result, there has been a problem in that the specific surface area of the positive electrode active material is reduced and desired battery performance is not obtained.

Further, when an all-solid secondary battery is manufactured, the positive electrode active material and solid electrolyte powder formed of beta alumina or a NASICON crystal are mixed with each other to form a composite material as a positive electrode, and then the composite material as a positive electrode is fired. However, in this case, the positive electrode active material and the solid electrolyte react with each other to precipitate a maricite-type $NaFePO_4$ crystal that does not contribute to the charge and discharge. As a result, there has been a problem in that the charge and discharge capacities decrease.

In view of the foregoing, it is an object of the present invention to manufacture a positive electrode material for an electrical storage device excellent in charge and discharge capacities by suppressing the excessive fusion and reaction between the raw material powders during firing.

Solution to Problem

According to one embodiment of the present invention, there is provided a method of manufacturing a positive electrode material for an electrical storage device, the positive electrode material for an electrical storage device comprising a positive electrode active material represented by a general formula $Na_x(Fe_{1-a}M_a)_yP_2O_z$, where M represents at least one kind of transition metal element selected from the group consisting of Cr, Mn, Co, and Ni, x satisfies $1.2 \leq x \leq 2.8$, y satisfies $0.95 \leq y \leq 1.6$, a satisfies $0 \leq a \leq 0.9$, and z satisfies $7 \leq z \leq 8$, the method comprising a step of firing an oxide material serving as a raw material at from 400° C. to 610° C. in a reducing atmosphere.

By firing the oxide material serving as a raw material in the reducing atmosphere of hydrogen or the like, Fe ions in the oxide material can be sufficiently reduced from trivalent ions to divalent ions even though the firing temperature is relatively low. With this, a positive electrode material for a sodium ion secondary battery excellent in charge and discharge capacities can be manufactured with suppressing the excessive fusion between the raw material powders during firing.

In the method of manufacturing a positive electrode material for an electrical storage device according to the embodiment of the present invention, it is preferred that the oxide material be amorphous.

According to the above-mentioned configuration, the oxide material is softened to flow during firing, and the contact area between the oxide materials increases, so that an ion conduction path is easily formed.

In the method of manufacturing a positive electrode material for an electrical storage device according to the embodiment of the present invention, it is preferred that the oxide material contain, in terms of mol %, 25% to 55% of $Na_2O$, 10% to 30% of $Fe_2O_3+Cr_2O_3+MnO+CoO+NiO$, and 25% to 55% of $P_2O_5$. "$Cr_2O_3+Fe_2O_3+MnO+CoO+NiO$" represents the total amount of these components.

In the method of manufacturing a positive electrode material for an electrical storage device according to the embodiment of the present invention, it is preferred that the oxide material have an average particle diameter $D_{50}$ of from 0.05 μm to 3 μm.

In the method of manufacturing a positive electrode material for an electrical storage device according to the embodiment of the present invention, the raw material may comprise a sodium ion conductive solid electrolyte.

When the sodium ion conductive solid electrolyte (hereinafter sometimes referred to as "solid electrolyte") is mixed with the oxide material serving as a raw material, the mixture can be used as a composite material for an all-solid secondary battery. Also in this case, the precipitation of a crystal, such as a maricite-type $NaFePO_4$ crystal, that does not contribute to the charge and discharge can be suppressed by firing the composite material as a positive electrode at a relatively low temperature in the reducing atmosphere. As a result, a positive electrode material for a sodium ion secondary battery excellent in charge and discharge capacities can foe manufactured.

In the method of manufacturing a positive electrode material for an electrical storage device according to the embodiment of the present invention, it is preferred that the sodium ion conductive solid electrolyte comprise beta alumina or a NASICON crystal.

In the method of manufacturing a positive electrode material for an electrical storage device according to the embodiment of the present invention, it is preferred that the raw material comprise, in terms of mass %, 30% to 100% of the oxide material, 0% to 20% of the conductive carbon, and 0% to 70% of the sodium ion conductive solid electrolyte.

According to one embodiment of the present invention, there is provided a positive electrode material for an electrical storage device, comprising a positive electrode active material represented by a general formula $Na_x(Fe_{1-a}M_a)_yP_2O_z$, where M represents at least one kind of transition metal element selected from the group consisting of Cr, Mn, Co, and Ni, x satisfies $1.2 \le x \le 2.8$, y satisfies $0.95 \le y \le 1.6$, a satisfies $0 \le a \le 0.9$, and z satisfies $7 \le z \le 8$, the positive electrode active material having an average particle diameter $D_{50}$ of 20 μm or less.

According to one embodiment of the present invention, there is provided a positive electrode material for an electrical storage device, comprising a positive electrode active material and a sodium ion conductive solid electrolyte, wherein the positive electrode active material is represented by a general formula $Na_x(Fe_{1-a}M_a)_yP_2O_z$, where M represents at least one kind of transition metal element selected from the group consisting of Cr, Mn, Co, and Ni, x satisfies $1.2 \le z \le 2.8$, y satisfies $0.95 \le y \le 1.6$, a satisfies $0 \le a \le 0.9$, and z satisfies $7 \le z \le 8$.

Advantageous Effects of Invention

According to the present invention, the positive electrode material for a sodium ion secondary battery excellent in charge and discharge capacities can be manufactured with suppressing the excessive fusion and reaction between the raw material powders during firing.

DESCRIPTION OF EMBODIMENTS

A method according to one embodiment of the present invention is a method of manufacturing a positive electrode material for an electrical storage device, the positive electrode material for an electrical storage device comprising a positive electrode active material represented by the general formula $Na_x(Fe_{1-a}M_a)_yP_2O_z$, where M represents at least one kind of transition metal element selected from the group consisting of Cr, Mn, Co, and Ni, x satisfies $1.2 \le x \le 2.8$, y satisfies $0.95 \le y \le 1.6$, a satisfies $0 \le a \le 0.9$, and z satisfies $7 \le z \le 8$, the method comprising a step of firing an oxide material serving as a raw material at from 400° C. to 610° C. in a reducing atmosphere.

Now, the detail of each constituent feature is described.

(1) Positive Electrode Active Material

A positive electrode active material is represented by the general formula $Na_x(Fe_{1-a}M_a)_yP_2O_z$, where M represents at least one kind of transition metal element selected from the group consisting of Cr, Mn, Co, and Ni, x satisfies $1.2 \le x \le 2.8$, y satisfies $0.95 \le y \le 1.6$, a satisfies $0 \le a \le 0.9$, and z satisfies $7 \le z \le 8$. The reason for defining the range of the coefficient of each component as described above is described below.

Na serves as a supply source of sodium ions that move between a positive electrode material and a negative electrode material during the charge and discharge. In the general formula, x is preferably from 1.2 to 2.8, more preferably from 1.3 to 2.3, particularly preferably from 1.5 to 2.2. When x is excessively small, the amount of sodium ions contributing to the insertion and extraction is reduced, and hence the charge and discharge capacities are liable to decrease. Meanwhile, when x is excessively large, other crystals, such as $Na_3PO_4$, that are not involved in the charge and discharge are liable to be precipitated, and hence the charge and discharge capacities are liable to decrease.

When the sodium ions are extracted from and inserted in the positive electrode material along with the charge and discharge, Fe is changed in valence of Fe ions to cause a redox reaction. Due to the redox reaction, the positive electrode material exhibits a high oxidation-reduction potential. In addition, Fe is a component that imparts high structural stability to the positive electrode active material during the charge and discharge, to thereby enhance cycle performance. Further, in the same manner as in Fe, M also serves to increase the oxidation-reduction potential of the positive electrode material by being changed in valence during the charge and discharge. In particular, Mn and Ni are preferred because Mn and Ni exhibit a relatively high oxidation-reduction potential. In the general formula, y is preferably from 0.95 to 1.6, more preferably from 0.95 to 1.4, particularly preferably from 0.95 to 1.25. When y is excessively small, the amount of the transition metal element causing the redox reaction is reduced to decrease the amount of the sodium ions that are involved in insertion and extraction. Therefore, the charge and discharge capacities are liable to decrease. Meanwhile, when y is excessively large, other crystals, such as $NaFePO_4$, that are not involved in the charge and discharge are liable to be precipitated, and hence the charge and discharge capacities are liable to decrease. In the general formula, a is preferably from 0 to 0.9, more preferably from 0 to 0.5, particularly preferably from 0 to 0.3. As a becomes smaller, the cycle performance is likely to be stabilized when such positive electrode active material is used for an electrical storage device. In particular, it is preferred that a be equal to 0. For example, a triclinic crystal represented by $Na_{1.56}Fe_{1.22}P_2O_7$ (PDF card No. 83-0225) exhibits excellent performance of theoretical charge and discharge capacities of 96.4 mAh/g and a theoretical discharge voltage of 2.9 V.

$P_2O_z$ forms a three-dimensional network structure and has an effect to stabilize the structure of the positive electrode material. In the general formula, z is preferably from 7 to 8, more preferably from 7 to 7.8, particularly preferably from 7 to 7.5. When z is excessively small, each of the valences of Fe and M becomes less than 2, and a metal is liable to be precipitated along with the charge and discharge. The precipitated metal is eluted into an electrolyte and precipitated as a metal dendrite on a negative electrode side, which may cause short circuit. Meanwhile, when z is excessively large, each of the valences of Fe and M becomes more than 2, and the redox reaction due to the charge and discharge of a battery does not occur easily. As a result, the amount of the sodium ions to be inserted and extracted is reduced, and hence the charge and discharge capacities are liable to decrease.

The crystallinity of the positive electrode active material obtained by the method of manufacturing a positive electrode material for an electrical storage device according to the present invention is preferably 40 mass % or more, more preferably 50 mass % or more, particularly preferably 60 mass % or more. When the crystallinity of the positive electrode active material is excessively low, the charge and discharge capacities are liable to decrease. The upper limit of the crystallinity is not particularly limited, but the crystallinity is practically 99 mass % or less.

The crystallinity of the positive electrode active material is determined by carrying out peak separation to each crystalline diffraction line and an amorphous halo in a diffraction line profile ranging from 10° to 60° in terms of a 2θ value obtained by powder X-ray diffraction measurement using CuKα rays. Specifically, the content Xc of the crystal is determined on the basis of the following equation, where an integral intensity obtained by carrying out the peak separation of a broad diffraction line (amorphous halo) in the range of from 10° to 45° from a total scattering curve obtained by performing background subtraction from the diffraction line profile is defined as Ia, the total sum of integral intensities obtained by carrying out the peak separation of each crystalline diffraction line derived from the $Na_x(Fe_{1-a}M_a)_yP_2O_z$ crystal detected in the range of from 10° to 60° from the total scattering curve is defined as Ic, and the total sum of integral intensities obtained from other crystalline diffraction lines is defined as Io.

$$Xc=[Ic/(Ic+Ia+Io)]\times100(\%)$$

As the crystallite size of the $Na_x(Fe_{1-a}M_a)_yP_2O_z$ crystal becomes smaller, the average particle diameter of the positive electrode active material particles can be reduced, and electric conductivity can be improved. Specifically, the crystallite size of the $Na_x(Fe_{1-a}M_a)_yP_2O_z$ crystal is preferably 100 nm of less, particularly preferably 80 nm or less. The lower limit of the crystallite size is not particularly limited, but the crystallite size is practically 1 nm or more, further 10 nm or more. The crystallite size is determined in accordance with the Scherrer equation on the basis of the analysis results of powder X-ray diffraction.

(2) Oxide Material

There is no particular limitation on an oxide material as long as the oxide material generates a positive electrode active material crystal represented by the general formula $Na_x(Fe_{1-a}M_a)_yP_2O_z$ by firing. The oxide material may be crystalline or amorphous. However, it is preferred that the oxide material be amorphous because the oxide material is softened to flow during firing to form an amorphous phase simultaneously with the generation of the positive electrode active material crystal, to thereby form an ion conduction path with respect to the electrolyte.

It is preferred that the oxide material contain, in terms of the following oxides in mol %, 25% to 55% of $Na_2O$, 10% to 30% of $Fe_2O_3+Cr_2O_3+MnO+CoO+NiO$, and 25% to 55% of $P_2O_5$. The reasons why the composition is limited as described above are described below.

$Na_2O$ is a main component of the positive electrode active material represented by the general formula $Na_x(Fe_{1-a}M_a)_yP_2O_z$. The content of $Na_2O$ is preferably from 25% to 55%, particularly preferably from 30% to 50%. When the content of $Na_2O$ is excessively small or excessively large, the charge and discharge capacities are liable to decrease.

$Fe_2O_3$, $Cr_2O_3$, MnO, CoO, and NiO are also main components of the positive electrode active material represented by the general formula $Na_x(Fe_{1-a}M_a)_yP_2O_z$. The content of $Fe_2O_3+Cr_2O_3+MnO+CoO+NiO$ is preferably from 10% to 30%, particularly preferably from 15% to 25%. When the content of $Fe_2O_3Cr_2O_3+MnO+CoO+NiO$ is excessively small, the charge and discharge capacities are liable to decrease. Meanwhile, when the content of $Fe_2O_3+Cr_2O_3+MnO+CoO+NiO$ is excessively large, undesired crystals of $Fe_2O_3$, $Cr_2O_3$, MnO, CoO, NiO, or the like are liable to be precipitated. The content of $Fe_2O_3$ is preferably from 1% to 30%, more preferably from 5% to 30%, still more preferably from 10% to 30%, particularly preferably from 15% to 25%. The content of each component of $Cr_2O_3$, MnO, CoO, and NiO is preferably from 0% to 30%, more preferably from 10% to 30%, particularly preferably from 15% to 25%. In order to enhance the cycle performance, it is preferred that $Fe_2O_3$ be contained in a positive manner.

$P_2O_5$ is also a main component of the oxide material represented by the general formula $Na_x(Fe_{1-a}M_a)_yP_2O_z$. The content of $P_2O_5$ is preferably from 25% to 55%, particularly preferably from 30% to 50%. When the content of $P_2O_5$ is excessively small or excessively large, the charge and discharge capacities are liable to decrease.

The oxide material may contain $Nb_2O_5$, MgO, $Al_2O_3$, $TiO_2$, $ZrO_2$, or $Sc_2O_3$ besides the above-mentioned components. These components have an effect to enhance the electron conductivity, and hence the high speed charge-discharge performance improves easily. The total content of these components is preferably from 0% to 25%, particularly preferably from 0.2% to 10%. When the content of these components is excessively large, other crystals that do not contribute to the battery performance is generated, and the charge and discharge capacities are liable to decrease.

In addition to the above-mentioned components, the oxide material may also contain $SiO_2$, $B_2O_3$, $GeO_2$, $Ga_2O_3$, $Sb_2O_3$, or $Bi_2O_3$. When these components are contained, glass formability improves, and a homogeneous oxide material is easily obtained. The total content of these components is preferably from 0% to 25%, particularly preferably from 0.2% to 10%. These components do not contribute to the battery performance. Therefore, when the total content is excessively large, the charge and discharge capacities are liable to decrease.

It is preferred that the oxide material be manufactured by melting and forming a raw material batch. This method is preferred because the oxide material excellent in homogeneity is obtained easily. Specifically, the oxide material can be manufactured as follows. First, raw material powder is prepared so as to have a desired composition, to thereby provide a raw material batch. Then, the obtained raw material batch is melted. The melting temperature is appropriately adjusted so that the raw material batch is homogeneously melted. For example, the melting temperature is preferably 800° C. or more, particularly preferably 900° C. or more. The upper limit of the melting temperature is not particularly limited, but an excessively high melting temperature leads to an energy loss and the evaporation of a sodium component, and hence the melting temperature is preferably 1500° C. or less, particularly preferably 1400° C. or less.

The obtained molten material is formed to provide an oxide material. A method for the forming is not particularly limited. For example, the molten material may be poured between a pair of cooling rolls and formed into a film shape while rapidly cooled, or the molten material may be poured out into a mold and formed into an ingot shape. The oxide material after the forming may contain a crystal.

The obtained formed body is pulverized as necessary to be formed into powder. The average particle diameter D50 of the oxide material powder is preferably from 0.05 μm to 3 μm, more preferably from 0.1 μm to 1.5 μm, still more preferably from 0.2 μm to 1.2 μm, particularly preferably from 0.3 μm to 1 μm. When the average particle diameter D50 is excessively small, an aggregation force between particles increases, so that, in the case of the oxide material powder being made into a paste, the oxide material powder is difficult to disperse into the paste. Further, when the oxide material powder is mixed with the sodium ion conductive solid electrolyte or the like, the oxide material powder is difficult to disperse uniformly into the mixture. As a result, the positive electrode material is aggregated to be unevenly distributed, and the transfer of the sodium ions with respect to the sodium ion conductive solid electrolyte is inhibited. As a result, the internal resistance increases, so that the voltage performance is liable to decrease. Meanwhile, when the average particle diameter D50 is excessively large, the sodium ion diffusion amount per unit surface area of the positive electrode material decreases, and hence the internal resistance is liable to increase. Further, when the oxide material powder is mixed with the sodium ion conductive solid electrolyte, the adhesiveness between the oxide material and the solid electrolyte decreases. Therefore, the mechanical strength of a positive electrode layer is liable to decrease, and the positive electrode layer and the solid electrolyte layer are liable to peel from each other. As a result, the voltage performance and the charge and discharge capacities are liable to decrease.

In the present invention, the average particle diameter means D50 (average particle diameter based on a volume) and refers to a value measured by a laser diffraction scattering method.

(3) Other Raw Materials (3-1) Conductive Carbon

Conductive carbon is a component for forming an electron conduction path in the positive electrode material. In the case of the conductive carbon being added, it is preferred that the conductive carbon be added when the oxide material is pulverized. The conductive carbon serves as a pulverizing agent and can be homogeneously mixed with the oxide material. In addition, the conductive carbon suppresses the excessive fusion between the oxide material particles during firing to ensure conductivity, and hence the quick charge-discharge performance improves easily.

As the conductive carbon, highly conductive carbon blacks, such as acetylene black and Ketjen black, carbon powders, such as graphite, carbon fibers, or the like can be used. Of these, acetylene black having high electron conductivity is preferred.

(3-2) Sodium Ion Conductive Solid Electrolyte

A sodium ion conductive solid electrolyte is a component for causing sodium ion conduction between a positive electrode and a negative electrode in an all-solid electrical storage device.

It is preferred that the sodium ion conductive solid electrolyte be beta alumina or a NASICON crystal, because the beta alumina and the NASICON crystal are excellent in sodium ion conductivity. As the beta alumina, two kinds of crystal types: β-alumina (theoretical composition formula: $Na_2O \cdot 11Al_2O_3$) and β"-alumina (theoretical composition formula: $Na_2O \cdot 5.3Al_2O_3$) are available. β"-alumina is a metastable substance, and hence β"-alumina having $Li_2O$ or MgO serving as a stabilizer added thereto is generally used. β"-alumina has sodium ion conductivity higher than that of β-alumina. Therefore, it is preferred that β"-alumina foe used alone or a mixture of β"-alumina and β-alumina be used. It is more preferred that $Li_2O$-stabilized β"-alumina ($Na_{1.7}Li_{0.3}Al_{10.7}O_{17}$) or MgO-stabilized β"-alumina (($Al_{10.32}Mg_{0.68}O_{16}$) ($Na_{1.68}O$)) be used.

As the NASICON crystal, a sintered product containing a crystal of, for example, $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_3$, $Na_3Zr_{1.88}Y_{0.12}Si_2PO_{12}$, $Na_{3.12}Zr_{1.88}Y_{0.12}Si_2PO_{12}$, or $Na_{3.6}Zr_{0.13}Yb_{1.67}Si_{0.11}P_{2.9}O_{12}$ is preferred, and $Na_{3.12}Zr_{1.88}Y_{0.12}Si_2PO_{12}$ is particularly preferred because the sodium ion conductivity is excellent.

The average particle diameter D50 of the sodium ion conductive solid electrolyte is preferably from 0.5 μm to 25 μm, more preferably from 1 μm to 20 μm, particularly preferably from 1.2 μm to 15 μm. When the average particle diameter D50 of the sodium ion conductive solid electrolyte is excessively small, the sodium ion conductive solid electrolyte is difficult to uniformly mix with the oxide material. In addition, the sodium ion conductive solid electrolyte absorbs moisture and is carbonated, and hence the ion conduction is liable to decrease. As a result, the internal resistance is liable to increase, and the voltage performance and the charge and discharge capacities are liable to decrease. Meanwhile, when the average particle diameter D50 of the sodium ion conductive solid electrolyte is excessively large, the oxide material is significantly prevented from being softened to flow. Therefore, the smoothness of a positive electrode layer to be obtained is liable to be deteriorated to decrease the mechanical strength, and the internal resistance is liable to increase.

(4) Configuration of Positive Electrode Material

It is preferred that the raw material of the positive electrode material contain, in terms of mass %, 30% to 100% of the oxide material, 0% to 20% of the conductive carbon, and 0% to 70% of the sodium ion conductive solid electrolyte. When the content of the oxide material is excessively small, the amount of the component for insertion or extraction sodium ions along with the charge and discharge in the positive electrode material is reduced, and hence the charge and discharge capacities of the electrical storage device are liable to decrease. Meanwhile, when the content of the conductive carbon or the sodium ion conductive solid electrolyte is excessively large, the binding property of the oxide material decreases to increase the internal resistance, and hence the voltage performance and the charge and discharge capacities are liable to decrease.

It is preferred that the composition ratio of the raw material be appropriately selected depending on the kind of an electrolyte to be used. For example, in an electrical storage device using a liquid-based electrolyte, such as a water-based electrolyte or an organic solvent-based electrolyte, the raw-material comprises, in terms of mass %, preferably 80% to 100% of the oxide material and 0% to 20% of the conductive carbon, more preferably 85% to 98% of the oxide material and 2% to 15% of the conductive carbon, more preferably 90% to 95% of the oxide material and 5% to 10% of the conductive carbon. Further, in the solid electrical storage device using the sodium ion conductive solid electrolyte, the raw material comprises, in terms of mass %, preferably 44.5% to 94.5% of the oxide material, 5% to 55% of the solid electrolyte, and 0.5% to 15% of the conductive carbon, more preferably 50% to 92% of the oxide material, 7% to 50% of the solid electrolyte, and 1% to 10% of the conductive carbon.

The mixing of the raw material can be performed with a mixer, such as a rotation/revolution mixer or a tumbler mixing machine, or a general pulverizer, such as a mortar, a stone mill machine, a ball mill, an attritor, a vibrating ball mill, a satellite ball mill, a planetary ball mill, a jet mill, or a bead mill. In particular, it is preferred that the planetary ball mill be used. In the planetary ball mill, a plate revolves while a pot rotates, and very high shear energy can be efficiently generated. Therefore, the planetary ball mill can disperse the raw material homogeneously.

(5) Firing Condition

Firing is performed in a reducing atmosphere. As the reducing atmosphere, there is given an atmosphere containing at least one kind of reducing gas selected from $H_2$, $NH_3$, CO, $H_2S$, and $SiH_4$. From the viewpoint of efficiently reducing the Fe ions in the oxide material from trivalent ions to divalent ions, the atmosphere contains preferably at least one kind selected from $H_2$, $NH_3$ and CO, particularly preferably $H_2$ gas. When $H_2$ gas is used, it is preferred that inert gas, such as $N_2$, be mixed with the $H_2$ gas in order to lower the risk of explosion and the like during firing. Specifically, the reducing gas comprises, in terms of vol %, preferably 90% to 99.9% of $N_2$ and 0.1% to 10% of $H_2$, more preferably 90% to 99.5% of $N_2$ and 0.5% to 10% of $H_2$, particularly preferably 92% to 99% of $N_2$ and 1% to 4% of $H_2$.

The firing temperature (highest temperature) is preferably from 400° C. to 610° C., more preferably from 410° C. to 580° C., still more preferably from 420° C. to 500° C., particularly preferably from 425° C. to 450° C. When the firing temperature is excessively low, the Fe ions in the oxide material are not reduced from trivalent Fe ions to divalent Fe ions, and the voltage performance and the charge and discharge capacities are liable to decrease. Meanwhile, when the firing temperature is excessively high, the raw material powders excessively fuse to each other, and the reaction between the oxide material and the sodium ion conductive solid electrolyte proceeds to precipitate other crystals. As a result, the charge and discharge capacities of the positive electrode material are liable to decrease.

The retention time of the highest temperature during firing is preferably from 10 minutes to 600 minutes, more preferably from 30 minutes to 120 minutes. When the retention time is excessively short, the amount of heat energy to be applied is small, and hence the Fe ions in the oxide material are not easily reduced from trivalent ions to divalent ions. Meanwhile, when the retention time is excessively long, the raw material powders excessively fuse to each other, and hence the charge and discharge capacities of the positive electrode material are liable to decrease.

For firing, an electric heating furnace, a rotary kiln, a microwave heating furnace, a high-frequency heating furnace, or the like can be used.

When firing is performed under the above-mentioned conditions, the excessive fusion between the oxide material powders is suppressed. Therefore, the particle diameter of the positive electrode active material in the positive electrode material to be obtained becomes small, resulting in a positive electrode material for a sodium ion secondary battery excellent in charge and discharge capacities. Specifically, in the positive electrode material for a sodium ion secondary battery of the present invention, the average particle diameter $D_{50}$ of the positive electrode active material represented by the general formula $Na_x(Fe_{1-a}M_a)_yP_2O_z$ can be set to 20 μm or less, 10 μm or less, 5 μm or less, 2 μm or less, and further 1 μm or less. There is no particular limitation on the lower limit of the average particle diameter $D_{50}$ of the positive electrode active material, but the average particle diameter $D_{50}$ is practically 0.1 μm or more.

Further, when the sodium ion conductive solid electrolyte is mixed with the oxide material, and the mixture is fired, the precipitation of crystals that do not contribute to the charge and discharge, such as a maricite-type $NaFePO_4$ crystal, can be suppressed by firing the mixture under the above-mentioned conditions, and the crystal represented by the general formula $Na_x(Fe_{1-a}M_a)_yP_2O_z$ can be precipitated, That is, a positive electrode material for an electrical storage device containing the positive electrode active material represented by the general formula $Na_x(Fe_{1-a}M_a)_yP_2O_z$ and the sodium ion conductive solid electrolyte (specifically, formed of a sintered body of the positive electrode active material represented by the general formula $Na_x(Fe_{1-a}M_a)_yP_2O_z$ and the sodium ion conductive solid electrolyte) can be efficiently obtained. As a result, the positive electrode material for a sodium ion secondary battery excellent in charge and discharge capacities is obtained.

(6) Configuration of Positive Electrode

A binder and a conductive agent are further added as necessary to the positive electrode material for an electrical storage device obtained by the manufacturing method of the present invention, and the resultant is applied onto the surface of a metal foil or the like serving as a current collector, followed by firing. Thus, the resultant can be used as a positive electrode for an electrical storage device. Alternatively, a binder is added as necessary to the positive electrode material for an electrical storage device obtained by the manufacturing method of the present invention, and the resultant is applied onto the surface of a sodium ion conductive solid electrolyte layer, followed by firing. Thus, the resultant can be used as a positive electrode for an all-solid electrical storage device.

Examples of the binder include: water-soluble polymers, for example, cellulose derivatives, such as carboxymethylcellulose, hydroxypropylmethylcellulose, hydroxypropylcellulose, hydroxyethylcellulose, ethylcellulose, and hydroxymethylcellulose, and polyvinyl alcohol; thermosetting resins, such as a thermosetting polyimide, a phenol resin, an epoxy resin, a urea resin, a melamine resin, an unsaturated polyester resin, and polyurethane; and polycarbonate-based resins, such as polypropylene carbonate, and polyvinylidene fluoride.

Examples of the conductive agent include: highly conductive carbon blacks, such as acetylene black and Ketjen black; carbon powders, such as graphite; and carbon fibers.

EXAMPLES

Now, the present invention is described in detail by way of Examples. The present invention is by no means limited to the following Examples.

Examples 1 to 23 and Comparative Examples 1 to 8 are shown in Tables 1 to 4.

TABLE 1

| | | | Example | | Comparative Example | | | |
|---|---|---|---|---|---|---|---|---|
| | | | 1 | 2 | 1 | 2 | 3 | 4 |
| Positive electrode | Positive electrode material (mass %) | Oxide material | 85 | 85 | 85 | 85 | 85 | 85 |
| | | Conductive carbon | — | 5 | — | 5 | — | — |
| | Firing condition | Atmosphere | $N_2/H_2$ (96/4 vol %) | $N_2/H_2$ (96/4 vol %) | $N_2$ | $N_2$ | $N_2$ | $N_2/H_2$ (96/4 vol %) |
| | | Temperature/time | 450° C./1 hour | 450° C./1 hour | 620° C./1 hour | 620° C./1 hour | 450° C./1 hour | 620° C./1 hour |
| | Conductive agent (mass %) | | 5 | — | 5 | — | 5 | 5 |
| | Binder (mass %) | | 10 | 10 | 10 | 10 | 10 | 10 |
| | Precipitated crystal | | $Na_2FeP_2O_7$ | $Na_2FeP_2O_7$ | $Na_3Fe_2(PO_4)_3$ $Na_7Fe_3(P_2O_7)_4$ | $Na_2FeP_2O_7$ | $Na_3Fe_2(PO_4)_3$ $Na_7Fe_3(P_2O_7)_4$ | $Na_2FeP_2O_7$ |
| | Average particle diameter (μm) | | 0.8 | 0.7 | 26 | 32 | 0.8 | 36 |
| Battery performance | Discharge voltage (V) | | 2.95 | 3 | Charge and discharge cannot be performed | 2.61 | Charge and discharge cannot be performed | 2.8 |
| | Charge and discharge capacities (mAh/g) | | 68 | 87 | | 15 | | 32 |

TABLE 2

|  |  | Example | | | | | Comparative | | | |
| --- | --- | --- | --- | --- | --- | --- | --- | --- | --- | --- |
|  |  | 3 | 4 | 5 | 6 | 7 | 5 | 6 | 7 | 8 |
| Positive electrode material (mass %) | Oxide material | 76 | 81 | 76 | 76 | 81 | 76 | 76 | 76 | 76 |
|  | Solid electrolyte β″-alumina (stabilizier) | 21 (Li$_2$O) | 17 (Li$_2$O) | 21 (MgO) | — | — | 21 (Li$_2$O) | 21 (Li$_2$O) | 21 (Li$_2$O) | — |
|  | NASICON crystal | — | — | — | 21 | 17 | — | — | — | 21 |
|  | Conductive carbon | 3 | 2 | 3 | 3 | 2 | 3 | 3 | 3 | 3 |
| Solid electrolyte |  | Li$_2$O-stabilized β″-alumina | | MgO-stabilized β″-alumina | NASICON crystal | | Li$_2$O-stabilized β″-alumina | | | NASICON crystal |
| Firing condition | Atmosphere | N$_2$/H$_2$ (96/4 vol %) | | | | | N$_2$ | | N$_2$/H$_2$ (96/4 vol %) | |
|  | Temperature/time | 450° C./1 hour | | | | | 620° C./1 hour | 450° C./1 hour | 620° C./1 hour | |
| Precipitated crystal |  | Na$_2$FeP$_2$O$_7$ | | | | | NaFePO$_4$ | Na$_3$Fe$_2$(PO$_4$)$_3$ | NaFePO$_4$ | |
| Battery performance | Discharge voltage (V) | 2.78 | 2.65 | 2.83 | 2.85 | 2.6 | Charge and discharge cannot be performed | Charge and discharge cannot be performed | 2.4 | 2 |
|  | Charge and discharge capacities (mAh/g) | 68 | 56 | 71 | 73 | 61 |  |  | 3 | 2 |

TABLE 3

|  |  | Example | | | | |
| --- | --- | --- | --- | --- | --- | --- |
|  |  | 8 | 9 | 10 | 11 | 12 |
| Positive electrode material (mass %) | Oxide material | 72 | | | | |
|  | Solid electrolyte β″-alumina (stabilizer) | 25 (Li$_2$O) | | | | |
|  | Conductive carbon | 3 | | | | |
| Solid electrolyte |  | Li$_2$O-stabilized β″-alumina | | | | |
| Firing condition | Atmosphere | N$_2$/H$_2$ (96/4 vol %) | | | | |
|  | Temperature/time | 450° C./1 hour | 485° C./1 hour | 520° C./1 hour | 550° C./1 hour | 570° C./1 hour |
| Precipitated crystal |  | Na$_{1.56}$Fe$_{1.22}$P$_2$O$_7$ | | | | |
| Battery performance | Discharge voltage (V) | 2.60 | 2.63 | 2.63 | 2.67 | 2.68 |
|  | Charge and discharge capacities (mAh/g) | 29 | 30 | 32 | 45 | 35 |

TABLE 4

|  |  | Example | | | | | | | | | | |
| --- | --- | --- | --- | --- | --- | --- | --- | --- | --- | --- | --- | --- |
|  |  | 13 | 14 | 15 | 16 | 17 | 18 | 19 | 20 | 21 | 22 | 23 |
| Positive electrode material (mass %) | Oxide material | 74 | 73 | 70 | 68 | 84.7 | 72.0 | 66.7 | 62.6 | 55.4 | 49.7 | 32.0 |
|  | Solid electrolyte β″-alumina (stabilizer) | 25 (Li$_2$O) | 25 (Li$_2$O) | 25 (Li$_2$O) | 25 (Li$_2$O) | 11.8 (Li$_2$O) | 25.0 (Li$_2$O) | 30.6 (Li$_2$O) | 34.8 (Li$_2$O) | 42.3 (Li$_2$O) | 48.3 (Li$_2$O) | 66.7 (Li$_2$O) |
|  | Conductive carbon | 1 | 2 | 5 | 7 | 3.5 | 3.0 | 2.8 | 2.6 | 2.3 | 2.1 | 1.3 |
| Solid electrolyte |  | Li$_2$O-stabilized β″-alumina | | | | | | | | | | |
| Firing condition | Atmosphere | N$_2$H$_2$ (96/4 vol %) | | | | | | | | | | |
|  | Temperature/time | 550° C./1 hour | | | | | | | | | | |
| Precipitated crystal |  | Na$_{1.56}$Fe$_{1.22}$P$_2$O$_7$ | | | | | | | | | | |
| Battery performance | Discharge voltage (V) | 2.50 | 2.58 | 2.67 | 2.55 | 2.80 | 2.56 | 2.65 | 2.76 | 2.72 | 2.66 | 2.75 |
|  | Charge and discharge capacities (mAh/g) | 16 | 32 | 43 | 6 | 30 | 45 | 53 | 67 | 59 | 55 | 38 |

(a) Preparation of Oxide Material

Sodium metaphosphate (NaPO$_3$), ferric oxide (Fe$_2$O$_3$), and orthophosphoric acid (H$_3$PO$_4$) were used as raw materials to prepare raw material powder having a composition comprising, in terms of mol %, 40% of Na$_2$O, 20% of Fe$_2$O$_3$, and 40% of P$_2$O$_5$. The raw material powder was melted at 1250° C. for 45 minutes in the atmosphere. Then, the molten glass was poured into a gap between a pair of rotating rollers and formed while rapidly cooled, to thereby provide a film-shaped glass having a thickness of from 0.1 mm to 2 mm. The film-shaped glass was subjected to ball mill pulverization with ZrO$_2$ balls of φ20 mm for 5 hours, and then passed through a resin sieve having an opening of 120 μm, to thereby provide glass coarse powder having an average particle diameter of from 3 μm to 15 μm.

Then, the glass coarse powder was subjected to ball mill pulverization with ZrO$_2$ balls of φ3 mm for 80 hours through use of ethanol as a pulverizing agent, to thereby provide glass powder having an average particle diameter of 0.7 µm. As a result of the powder X-ray diffraction (XRD) measurement, it was confirmed that the glass powder was amorphous.

(b) Preparation of Sodium Ion Conductive Solid Electrolyte ($Li_2O$-stabilized β"-alumina)

$Li_2O$-stabilized β"-alumina represented by the composition formula: $Na_{1.7}Li_{0.3}Al_{10.7}O_{17}$ manufactured by Ionotec was processed into a sheet shape having a thickness of 0.5 mm. The sheet-shaped $Li_2O$-stabilized β"-alumina was pulverized through use of a mortar and a pestle made of agate and passed through a sieve having an opening of 20 µm, to thereby provide a powdery solid electrolyte having an average particle diameter of 17 µm.

(MgO-stabilized β"-alumina)

Sodium carbonate ($Na_2CO_3$), aluminum oxide ($Al_2O_3$), and magnesium oxide (MgO) were used as raw materials to prepare raw material powder having a composition comprising, in terms of mol %, 13.0% of $Na_2O$, 80.2% of $Al_2O_3$, and 6.8% of MgO. The resultant was pulverized and mixed with a ball mill using $Al_2O_3$ balls of φ5 mm in ethanol for 10 hours. The obtained powder was formed into a sheet shape having a thickness of 0.5 mm, and then subjected to heat treatment in the atmosphere at 1640° C. for 1 hour, to thereby provide MgO-stabilized β"-alumina. The sheet-shaped MgO-stabilized β"-alumina was pulverized through use of a mortar and a pestle made of agate and passed through a sieve having an opening of 20 µm, to thereby provide a powdery solid electrolyte having an average particle diameter of 17 µm. The MgO-stabilized β"-alumina was investigated for its powder X-ray diffraction pattern, and as a result, a diffraction line derived from a trigonal crystal (($Al_{10.32}Mg_{0.68}O_{16}$) ($Na_{1.68}O$)) belonging to a space group R-3m was found.

(NASICON Crystal)

Sodium metaphosphate ($NaPO_3$), yttria-stabilized zirconia (($ZrO_2$)$_{0.97}$($Y_2O_3$)$_{0.03}$), sodium carbonate ($Na_2CO_3$), and silicon dioxide ($SiO_2$) were used as raw materials to prepare raw material powder having a composition comprising, in terms of mol %, 25.3% of $Na_2O$, 31.6% of $ZrO_2$, 1.0% $Y_2O_3$, 8.4% of $P_2O_5$, and 33.7% of $SiO_2$. The resultant was fired in the atmosphere at 1100° C. for 8 hours. The fired powder was subjected to ball mill pulverization with $Al_2O_3$ balls of φ20 mm for 24 hours. After that, the resultant was subjected to air classification, to thereby provide powder having an average particle diameter D50 of 2.0 µm. The obtained powder was formed into a sheet shape having a thickness of 0.5 mm, and the resultant sheet-shaped powder was subjected to heat treatment in the atmosphere at 1250° C. for 2 hours, to thereby provide a NASICON crystal. The sheet-shaped NASICON crystal was pulverized through use of a mortar and a pestle made of agate and passed through a sieve having an opening of 20 µm, to thereby provide a powdery solid electrolyte having an average particle diameter of 17 µm. The NASICON crystal was investigated for its powder X-ray diffraction pattern, and as a result, a diffraction line derived from a trigonal crystal ($Na_{3.05}Zr_2Si_{2.05}P_{0.95}O_{12}$) belonging to a space group R-3c was found.

(c) Preparation of Test Battery (c-1) Preparation of Liquid-based Sodium Ion Secondary Battery In Example 1 and Comparative Examples 1, 3, and 4, the oxide material obtained in the foregoing was used as a raw material of a positive electrode material. In Example 2 and Comparative Example 2, a material obtained by weighing the oxide material obtained in the foregoing and acetylene black (SUPER C65 manufactured by TIMCAL) serving as conductive carbon in a ratio shown in Table 1 and subjecting the resultant to ball mill mixing with $ZrO_2$ balls of φ5 mm for 2 hours was used as a raw material of the positive electrode material. Each raw material of a positive electrode material of Examples 1 and 2 and Comparative Examples 1 to 4 was supplied into a carbon container and fixed under the firing condition shown in Table 1, to thereby provide a positive electrode material.

Each obtained positive electrode material was investigated for its powder X-ray diffraction pattern. As a result, in Examples 1 and 2 and Comparative Examples 2 and 4, a diffraction line derived from a $Na_2FeP_2O_7$ crystal in which the valence of Fe is 2 was found, and in Comparative Examples 1 and 3, a diffraction line derived from a $Na_3Fe_2$($PO_4$)$_3$ crystal and a $Na_7Fe_3$($P_2O_7$)$_4$ crystal in which the valence of Fe is 3 was found. Further, the average particle diameter D50 of the positive electrode material was measured by a laser diffraction scattering method, and as a result, enlargement of a particle diameter caused by fusion during firing was found in Comparative Examples 1, 2, and 4.

In each positive electrode material of Example 1 and Comparative Examples 1, 3, and 4, the acetylene black serving as a conductive agent and polyvinylidene fluoride (PVDF) serving as a binder were weighed in a ratio shown in Table 1, and in Example 2 and Comparative Example 2, only a binder was added to the obtained positive electrode material in a ratio shown in Table 1. Then, the materials were dispersed in N-methylpyrrolidone, and then thoroughly stirred with a rotation/revolution mixer to provide a slurry. Next, the resultant slurry was applied onto an aluminum foil having a thickness of 20 µm serving as a positive electrode current collector with using a doctor blade having a gap of 75 µm. The slurry coated on the aluminum foil was dried at 0° C. with a dryer, and was then passed through and pressed between a pair of rotating rollers at 1 t/cm² to provide an electrode sheet. The electrode sheet was punched with an electrode punching machine so as to have a diameter of 11 mm, and was dried at 140° C. for 6 hours to provide a circular working electrode.

Next, the obtained working electrode was placed on a lower lid of a coin cell with the aluminum foil surface of the working electrode facing downward, and there were laminated, on the working electrode, a glass filter, which had been dried at 200° C. for 8 hours, a separator formed of a polypropylene porous film (Celgard #2400 manufactured by Hoechst Celanese Corporation) having a diameter of 16 mm, which had been dried under reduced pressure at 60° C. for 8 hours, and metal sodium serving as an opposite electrode, thereby preparing a CR-2032 type test battery. As an electrolytic solution, a 1 M $NaPF_6$ solution/EC:DEC=1:1 (EC=ethylene carbonate, DEC=diethyl carbonate) was used. The assembly of the test battery was carried out in an argon atmosphere having a dew-point temperature of −70° C. or less.

(c-2) Preparation of Solid Sodium Ion Secondary Battery

In Examples 3 to 23 and Comparative Examples 5 to 8, the oxide material obtained in the foregoing, a solid electrolyte, and acetylene black (SUPER C65 manufactured by TIMCAL) serving as conductive carbon were weighed in a ratio shown in Tables 2 to 4, and the resultant was mixed through use of a mortar and a pestle made of agate for 30 minutes. Then, 10 parts by mass of polypropylene carbonate (Manufactured by Sumitomo Seika Chemicals Co., Ltd.) was added to 100 parts by mass of the mixed powder, and further 30 parts by mass of N-methylpyrrolidone was added to the mixture. Then, the resultant was thoroughly stirred with a rotation/revolution mixer to provide a slurry.

The obtained slurry was applied onto one surface of each solid electrolyte having a thickness of 0.5 mm shown in Tables 2 to 4 so as to have an area of 1 cm² and a thickness of 80 μm, and dried at 70° C. for 3 hours. Then, the resultant was placed in a carbon container and fired under the conditions shown in Tables 2 to 4, to thereby form a positive electrode material on one surface of a sodium ion conductive solid electrolyte layer. The above-mentioned operation was all performed in an environment having a dew point of −40° C. or less.

The obtained positive electrode material was investigated for its powder X-ray diffraction pattern, and as a result, a diffraction line derived from a $Na_2FeP_2O_7$ crystal in which the valence of Fe is 2 was found in Examples 3 to 7. Further, a diffraction line derived from a $Na_{1.56}Fe_{1.22}P_2O_7$ crystal in which the valence of Fe is 2 was found in Examples 8 to 23. Meanwhile, a maricite-type $NaFePO_4$ crystal in which the valence of Fe is 2 was found in Comparative Examples 5, 7 and 8, and a $Na_3Fe_2(PO_4)_3$ crystal in which the valence of Fe is 3 was found in Comparative Example 6. In any of the positive electrode materials, a crystalline diffraction line derived from each used solid electrolyte was found.

Next, a current collector made of a gold electrode having a thickness of 300 nm was formed on the surface of the positive electrode material through use of a sputtering device (SC-701AT manufactured by Sanyu Electron Co., Ltd.). Then, metal sodium serving as a counter electrode was pressure-bonded onto the other surface of the sodium ion conductive solid electrolyte layer in an argon atmosphere having a dew point of −60° C. or less. The resultant was placed on a lower lid of a coin cell and covered with an upper lid, thereby preps ring a CR2032-type test battery.

(d) Charge-Discharge Test

Each liquid-based sodium ion secondary battery of Examples 1 and 2 and Comparative Examples 1 to 4 shown in Table 1 was subjected to a charge-discharge test at 30° C., to thereby measure charge and discharge capacities and an average discharge voltage. The results are shown in Table 1. In the charge-discharge test, the charge (extraction of sodium ions from the positive electrode material) was performed through CC (constant current) charge at from an open-circuit voltage (OCV) to 4.3 V, and the discharge (insertion of sodium ions into the positive electrode material) was performed through CC discharge at from 4 V to 2 V. A C-rate was set to 0.1 C.

Each solid sodium ion secondary battery of Examples 3 to 23 and Comparative Examples 5 to 8 shown in Tables 2 to 4 was subjected to a charge-discharge test at 60° C., to thereby measure charge and discharge capacities and an average discharge voltage. The results are shown in Table 2. In the charged-discharge test, the charge was performed through CC (constant current) charge at from an open-circuit voltage (OCV) to 4.3 V, and the discharge was performed through CC discharge at from 4 V to 2 V. A C-rate was set to 0.01 C.

The charge and discharge capacities mean a quantity of electricity discharged per unit weight of the oxide material contained in the raw material of the positive electrode material.

As is apparent from Table 1, in Examples 1 and 2, the discharge voltage was from 2.95 V to 3 V, and the charge and discharge capacities were from 68 mAh/g to 87 mAh/g. Thus, Examples 1 and 2 were excellent in respective performance. Meanwhile, the charge and discharge were not able to be performed in Comparative Examples 1 and 3, and the discharge voltage was from 2.61 V to 2.8 V and the charge and discharge capacities were from 15 mAh/g to 32 mAh/g in Comparative Examples 2 and 4. Thus, Comparative Examples 1 and 3 and Comparative Examples 2 and 4 were unsatisfactory in respective performance.

Further, as is apparent from Tables 2 to 4, the discharge voltage was from 2.50 V to 2.85 V, and the charge and discharge capacities were from 6 mAh/g to 73 mAh/g in Examples 3 to 23. Meanwhile, the charge and discharge were not able to be performed in Comparative Examples 5 and 6, and the discharge voltage was from 2 V to 2.4 V and the charge and discharge capacities were from 2 mAh/g to 3 mAh/g in Comparative Examples 7 and 8. Thus, Comparative Examples 5 and 6 and Comparative Examples 7 and 8 were unsatisfactory in respective performance.

The invention claimed is:

1. A method of manufacturing a positive electrode material for an electrical storage device, the positive electrode material for an electrical storage device comprising a positive electrode active material represented by a general formula $Na_x(Fe_{1-a}M_a)_yP_2O_z$, where M represents at least one kind of transition metal element selected from the group consisting of Cr, Mn, Co, and Ni, x satisfies $1.2 \leq x \leq 2.8$, y satisfies $0.95 \leq y \leq 1.6$, a satisfies $0 \leq a \leq 0.9$, and z satisfies $7 \leq z \leq 8$, the method comprising a step of firing a raw material comprising a mixture of an oxide material powder and at least one of a conductive carbon powder and a conductive carbon fiber at from 400° C. to 610° C. in a reducing atmosphere.

2. The method of manufacturing a positive electrode material for an electrical storage device according to claim 1, wherein the oxide material powder is amorphous.

3. The method of manufacturing a positive electrode material for an electrical storage device according to claim 1, wherein the oxide material powder contains, in terms of mol %, 25% to 55% of $Na_2O$, 10% to 30% of $Fe_2O_3$, $Cr_2O_3$, MnO, CoO and NiO, and 25% to 55% of $P_2O_5$.

4. The method of manufacturing a positive electrode material for an electrical storage device according to claim 1, wherein the oxide material powder has an average particle diameter $D_{50}$ of from 0.05 μm to 3 μm.

5. The method of manufacturing a positive electrode material for an electrical storage device according to claim 1, wherein the raw material further comprises a sodium ion conductive solid electrolyte.

6. The method of manufacturing a positive electrode material for an electrical storage device according to claim 5, wherein the sodium ion conductive solid electrolyte comprises beta alumina or a NASICON crystal.

7. The method of manufacturing a positive electrode material for an electrical storage device according to claim 1, wherein the raw material comprises, in terms of mass %, 30% to 98% of the oxide material powder, 0.5% to 20% of at least one of the conductive carbon powder and the conductive carbon fiber, and 0% to 70% of a sodium ion conductive solid electrolyte.

8. The method of manufacturing a positive electrode material for an electrical storage device according to claim 1, wherein the conductive carbon powder comprises a highly conductive carbon black.

9. The method of manufacturing a positive electrode material for an electrical storage device according to claim 1, wherein the positive electrode material has an average particle diameter $D_{50}$ of less than 2 μm.

10. The method of manufacturing a positive electrode material for an electrical storage device according to claim 1, wherein the reducing atmosphere contains at least one kind of reducing gas selected from the group consisting of $H_2$, $NH_3$, CO, $H_2S$, and $SiH_4$.

* * * * *